B. T. WINCHESTER.
CAPSULE MACHINE.
APPLICATION FILED JULY 19, 1911.

1,125,619.

Patented Jan. 19, 1915.

6 SHEETS—SHEET 1.

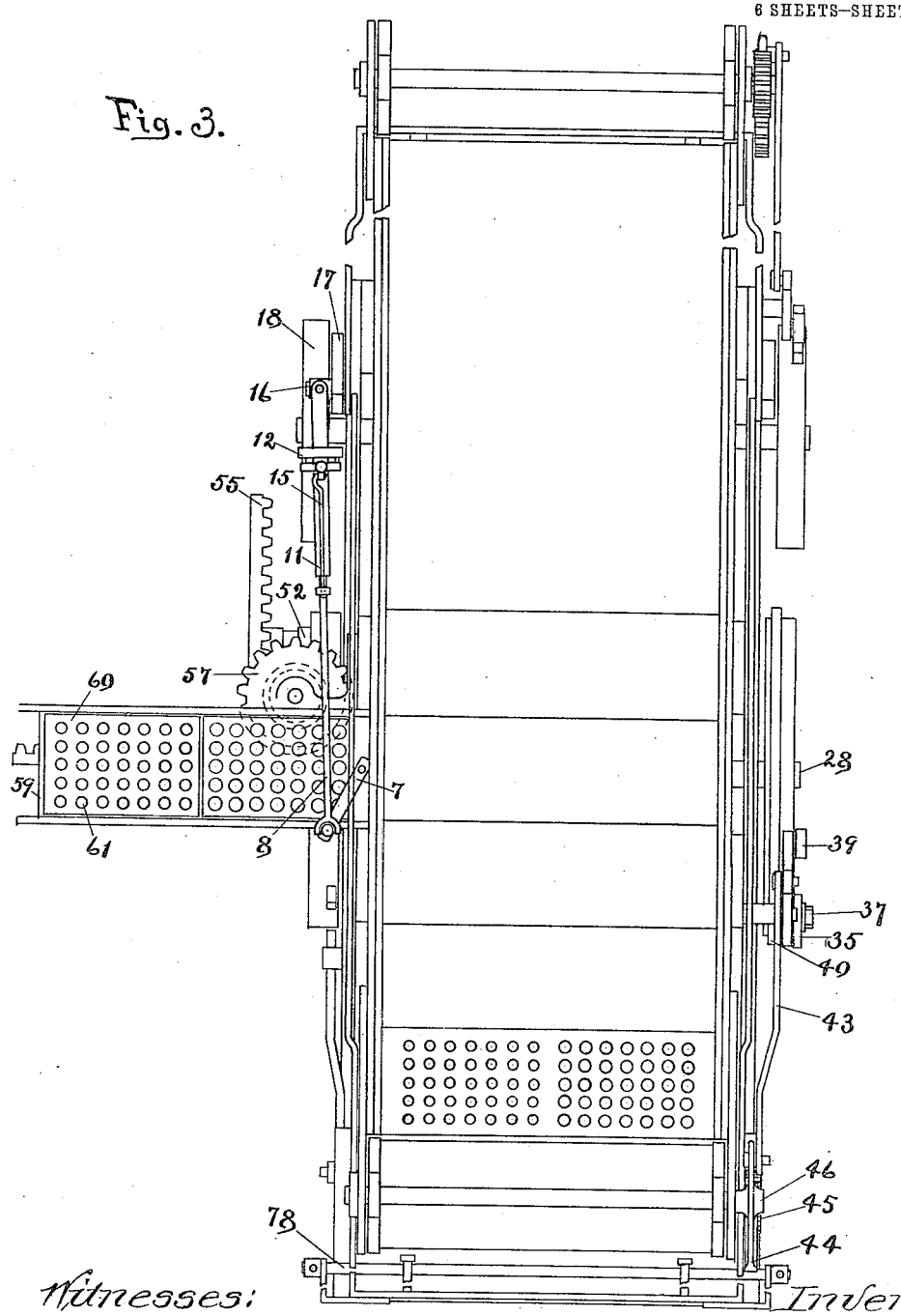

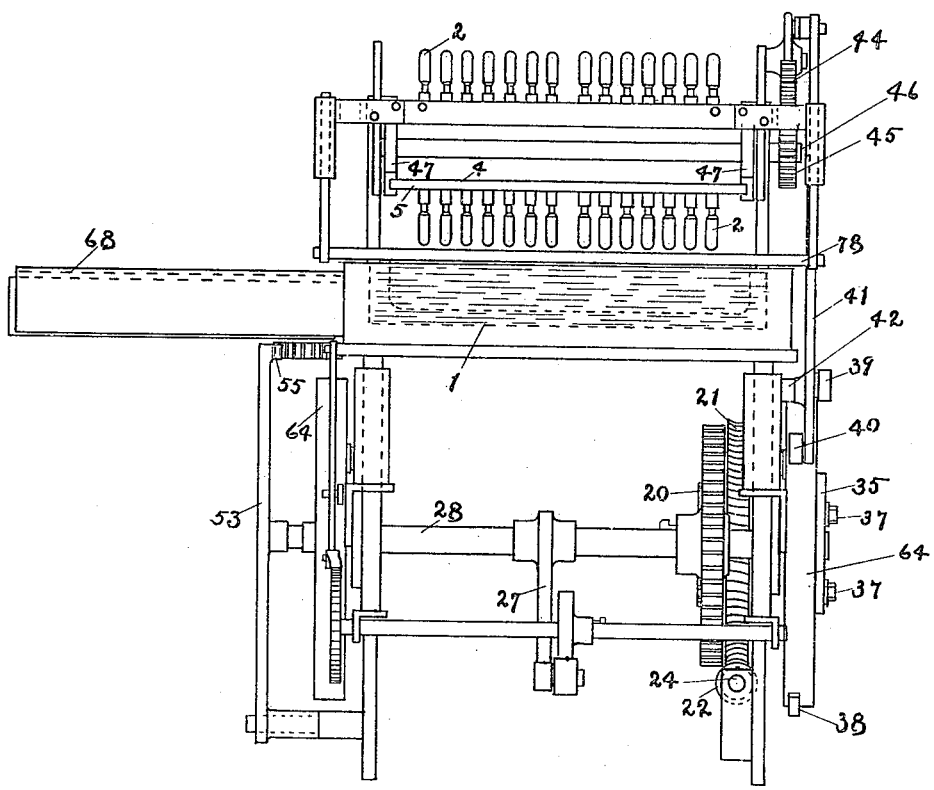

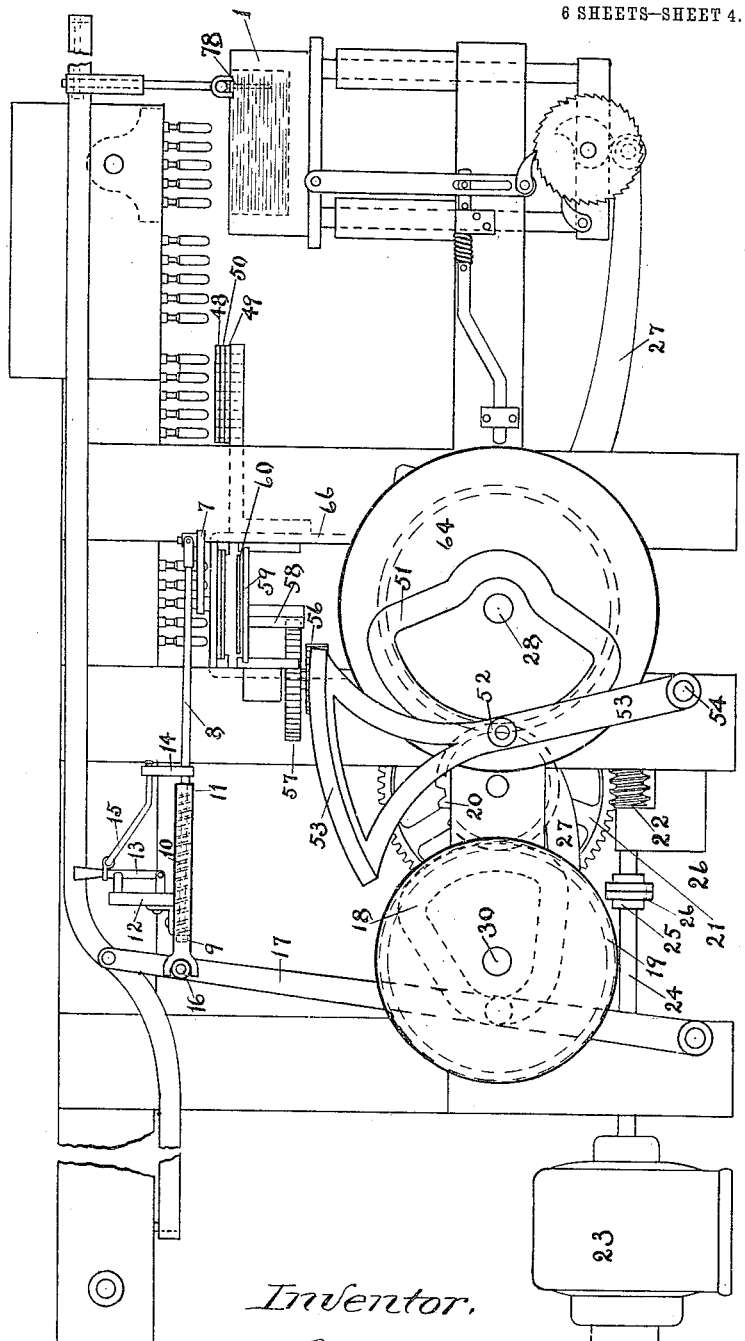

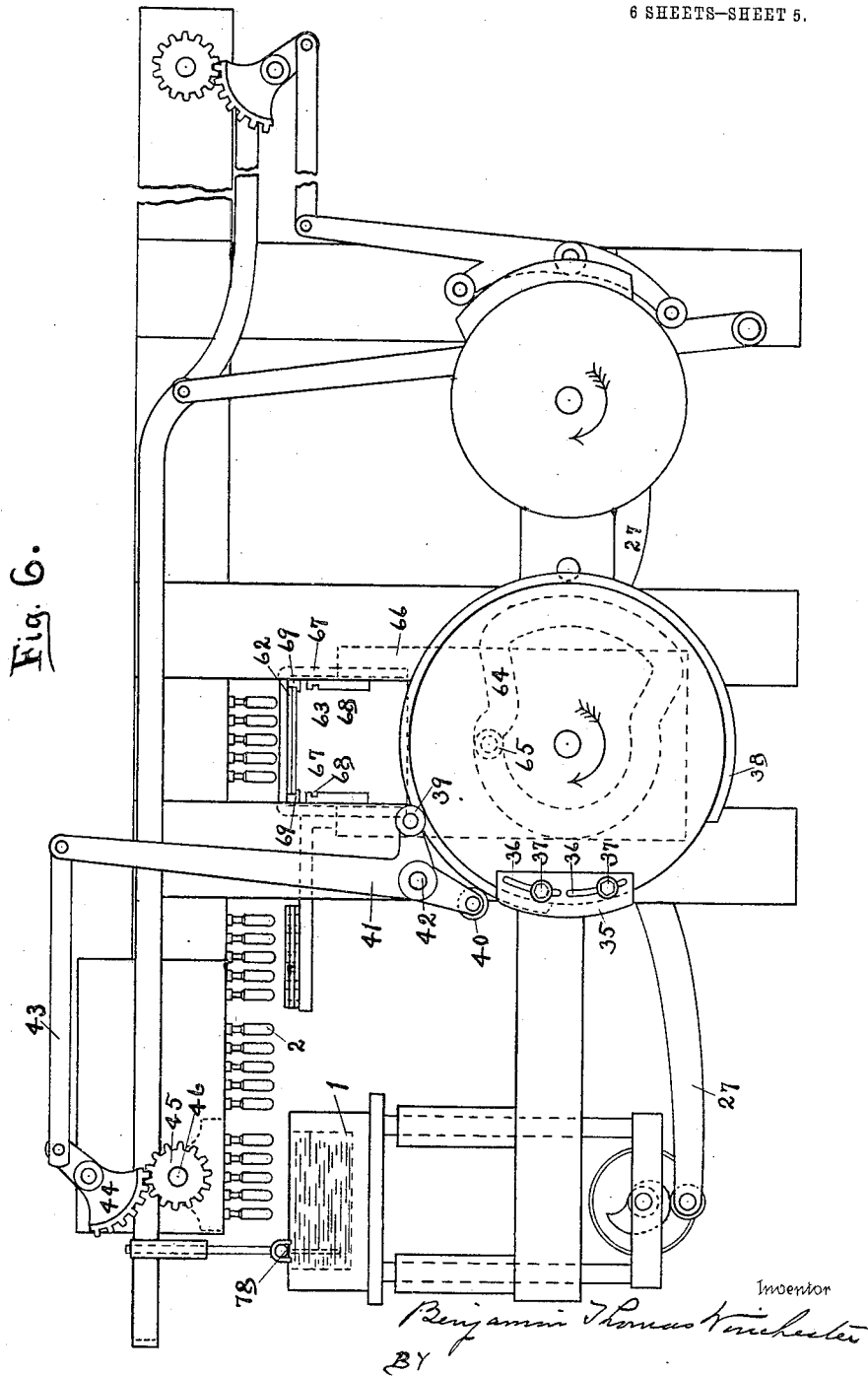

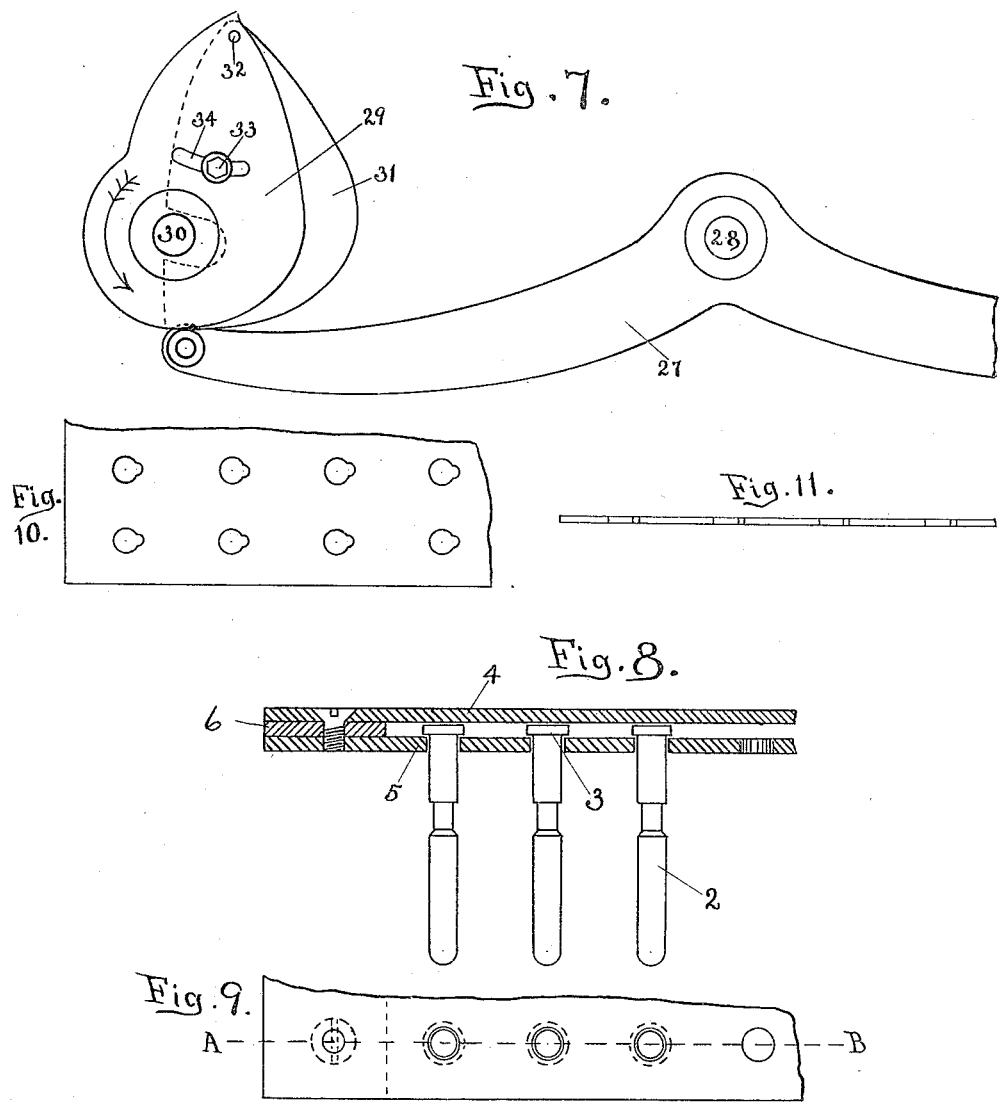

UNITED STATES PATENT OFFICE.

BENJAMIN THOMAS WINCHESTER, OF WINDSOR HILLS, MARYLAND, ASSIGNOR, BY MESNE ASSIGNMENTS, TO SHARP AND DOHME, OF BALTIMORE, MARYLAND, A CORPORATION OF NEW JERSEY.

CAPSULE-MACHINE.

1,125,619.  Specification of Letters Patent.  Patented Jan. 19, 1915.

Application filed July 19, 1911. Serial No. 639,244.

*To all whom it may concern:*

Be it known that I, BENJAMIN THOMAS WINCHESTER, a citizen of the United States, residing at Windsor Hills, in the county of Baltimore and State of Maryland, have invented a new and useful Capsule-Machine, of which the following is a specification.

My invention relates to improvements in capsule making machines for forming capsules of gelatin.

An object of the invention is to provide an improved machine for maintaining a liquid gelatin in condition to be applied to capsule forming devices uniformly and to allow the gelatin to cool and set and to then strip the capsules into portable receivers.

Another object is to provide an improved machine adapted to receive a plurality of movable peg plates; to carry the latter in parallel upper and lower tiers and to move said plates from the upper to the lower tier at one end and from the lower to the upper tier at the opposite end whereby the plates with the pegs may be conveyed past the several stations in the machine to effect the desired operations.

A further object is to provide an improved connection between the pegs and the plates that carry the same whereby the operation of forming, cooling or setting and stripping into improved receivers may be conducted in an expeditious manner.

Another object is to provide improved means for aiding in the setting of the gelatin-coating on the pegs.

A further object is to provide an improved mechanism for operating the gelatin container and to bring it and the pegs into proper relation as the quantity of the gelatin decreases in bulk.

Another object is to provide improved devices for removing or stripping the capsules from the pegs.

A further object is to provide a perforated device to receive the capsules from the stripper whereby to keep the same separated from one another.

Another object of the invention is to provide means for coating the pegs while the latter are in one position and to then reverse the said pegs and hold them in the reversed position while the coating sets.

Another object is to provide automatic means for controlling the action of the machine and to stop the same under certain conditions.

A further object is to provide improved means for lubricating the pegs after the capsules have been stripped therefrom.

Figure 1:
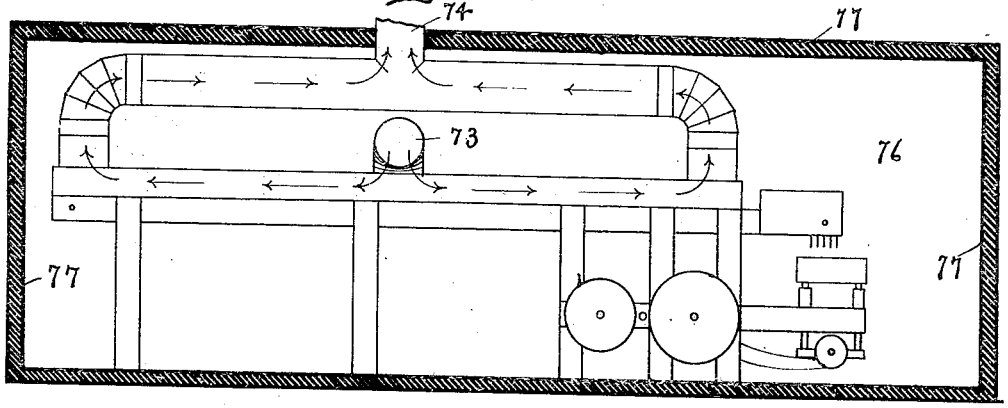
Figure 2:
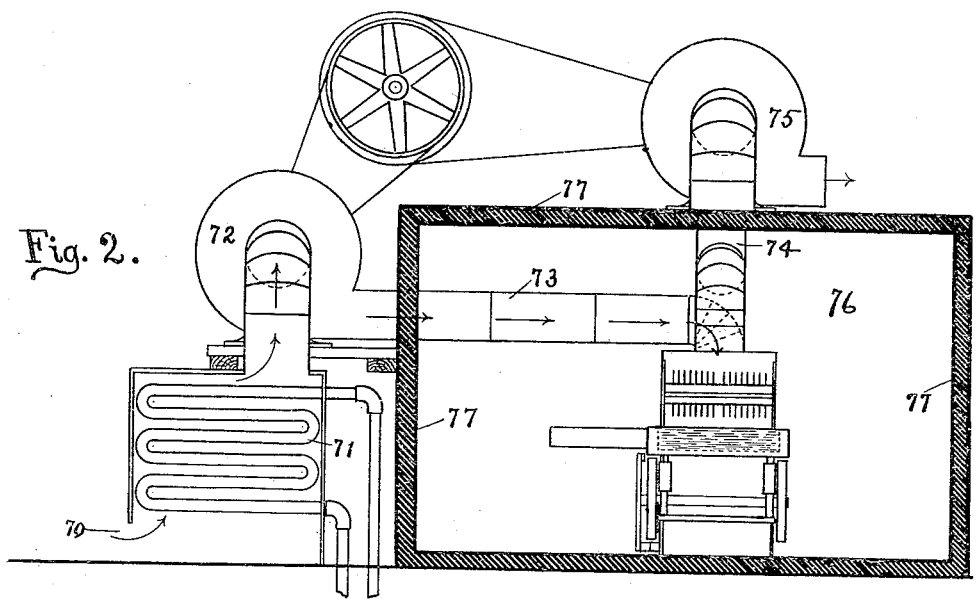

With these and other objects in view the accompanying drawings illustrate the invention, wherein, Figure 1 shows a side elevation of my machine the same being inclosed in its insulated room, the latter being shown in section; Fig. 2 is a view taken at right angles to that shown in Fig. 1; Fig. 3 is an enlarged plan view of the machine broken off and shortened up; Fig. 4 is an end view in elevation of the machine as shown in Fig. 3 looking at the dipping end; Fig. 5 is a side view in elevation of the machine as shown in Fig. 3 looking at the table or the operating side; Fig. 6, is a side view in elevation of the machine as shown in Fig. 3 looking from the other side from that shown in Fig. 5; Fig. 7, is an enlarged view of the adjustable cam for controlling the dipping of the pegs; Fig. 8 is a sectional view of the peg plates showing the loose securing of the pegs; Fig. 9, is an inverted or bottom plan view of a portion of the peg plate shown in Fig. 8; Fig. 10, shows an enlarged view of a portion of one of the portable receivers; and, Fig. 11, shows a sectional view of the same.

Similar numerals refer to similar parts throughout the several views.

1 is the gelatin bath container which holds the gelatin bath which latter is kept at a proper temperature by means not shown.

2 are the dipping pegs which are secured loosely between the peg plates 4 and 5 for the purpose of allowing some play of the peg in entering the pinch plate thus allowing a partial self adjustment.

3 is the head of the dipping peg for holding it in place.

4 is the outside peg plate.

5 is the inside peg plate.

6 is a distance piece to keep the peg plates apart a requisite distance in order not to jam the head of the dipping peg 3, the pegs protruding through inside peg plate 5.

7 is the pinch plate operating lever for operating the double pinch plate over the formed capsule for stripping purposes.

8 is a spring held pinch plate operating rod, said rod being held or operated by a spring in order to form an automatic throwout or switch in the event that something goes wrong in pinching and also forms a flexible connection if the pinch plates should refuse to act so that the machine would not be damaged.

9 is the head on said rod operating against spring 10.

11 is the operating rod sleeve in which is located spring 10.

12 is a switch body mounted on operating rod sleeve 11.

13 is the switch knife.

14 is a member secured to operating rod 8 for operating the switch and to which is connected knife connecting rod 15, the other end of which is connected to the switch knife 13.

16 is the universal joint connection, connecting operating rod sleeve 11, to track operating lever 17. Track operating lever 17 is operated by cam 18, which cam 18 is driven by gear 19 pinion 20 worm gear 21 and worm 22.

23 is an electric motor driving breakable shaft 24. The electric current to motor 23 is controlled by switch body 12 and knife 13.

25 is a two part clutch secured together by wooden pins 26 which are easily broken and connects motor driving shaft 24 to worm 22 thus admitting of an automatic stop in case the machine jams thus avoiding a possible breakage.

27 is the bath elevating lever fulcrumed on shaft 28. Shaft 28 carries, and operates, the stripper and also operates the forward turnover and the carriage.

29 is the adjustable bath elevating cam, and is secured to the shaft 30.

31 is the adjustable counterpart cam pivoted on 29 at 32 and adjustably secured to cam 29 by locking bolt 33, which locking bolt 33 allows adjustment relatively of cams 29 and 31 by means of slot 34, as shown in the enlarged view in Fig. 7.

35 is the adjustable section of turnover cam, made adjustable by means of slots 36 and bolts 37, thus allowing the same to be circularly adjusted thus effecting the time of turnover.

38 is the reverse turnover cam section, both cams 35 and 38 are mounted on a body on the side of which is cam 64, and is secured to shaft 28, one cam 38 permanently, and the other cam 35 adjustably. Cam 35 operates against roller 39 and cam 38 operates against roller 40 the said two cams not being in the same plane or alinement.

41 is the turnover lever fulcrumed at 42, and carrying rollers 39 and 40.

43 is a connecting link connecting turnover lever 41 to geared quadrant 44.

45 is the turnover pinion operated by geared quadrant 44 and secured to shaft 46 to which also is secured turnover track section 47.

48 is the top greaser holder.

49 is the bottom greaser holder plate.

50 is the greaser which consists of a woven double faced canton flannel extra thick (table felt) secured between the said top and bottom greaser holder plates 48 and 49.

51 is the carriage operating cam, operating roller 52, and carriage operating lever 53, which lever is fulcrumed at 54 and carries segmental gear 55, which gear operates pinion 56.

56 drives gear 57, which gear drives rack 58 secured to carriage 59. On carriage 59 are placed perforated receivers 60 which may be of cardboard or any material preferably light for handling into which the uncut capsules are stripped from the dipping pegs by means of the pinch plate.

61 designates the holes in the carriage into which the capsules are stripped.

62 and 63 are the pinch plates, operated by pinch plate operating lever 7 and worked up and down by cams 64 and operating rollers 65 which rollers are journaled onto pinch plate operating mechanism or sliding frame 66.

67 is the supporting plate.

68 designates the grooves or tracks for the carriage to slide in.

69 indicates the angles for holding the pinch plates in operative position against supporting plate 67.

Referring now to Fig. 2 of the drawing 70 is the air inlet. 71 are heating coils for heating the air which is passed over them. 72 is the blower for controlling the movement of the air. 73 is an air duct conducting the air to the machine and discharging the same onto the green capsules on the top track, which air circulates on and around the capsules in a plurality of sections and is discharged from the same through discharge conduit 74 preferably at or near the top of the room. 75 is a blower at the discharge for assisting in the exhaust. The capsules after having finished the journey on the track are turned over and out of the mechanically moved air into the air of the surrounding room on their return to the stripping mechanism.

The surrounding or operating room 76 is insulated for temperature and humidity against the external atmosphere by insulating walls 77. The air in operating room 76 is artificially treated and maintained at a proper working temperature and humidity by means not shown, for proper dipping and stripping of the capsules.

The operation of my invention is as follows—The gelatin properly mixed, is melted in the gelatin bath container by electrical or other means not shown and maintained at a proper working temperature. After being skimmed by skimmer 78 the pegs on the peg plates are dipped into and drawn out of the bath by means of the elevation and depression of the bath itself, which movement is controlled by the adjustable cams 29 and 31. The means to withdraw the pegs from the bath is adjustable so that the speed during withdrawal gradually decreases until the drop at the end of the pegs is out of the bath then the time of turnover to allow the gelatin to drain away from the ends of the pegs is also adjustable to meet the conditions of the air in room 76. The drop at the end and the thickness of capsule required is controlled by adjustable cam 35.

After the plates and the coated pegs have been turned over they are allowed to travel a certain distance to enable the drop on the end to uniformly distribute itself over the peg and also to allow the gelatin to set. The pegs with the capsule parts thereon then enter the mechanically moved prepared air and after traveling through the same for a predetermined distance, another section of similar air but not so loaded with moisture, is entered, thus allowing the curing of the capsule parts, after which the capsule parts are stripped from the pegs by pinch plates and the pegs are operated upon by the greaser.

The greaser consists of a woven fabric similar to double faced canton flannel with holes slightly smaller than the diameter of the pegs punched therein and through which the pegs work, this greaser is loaded with olive oil by means of dipping the pegs into the oil and allowing the pegs to do the greasing, the oil being kept at a temperature for proper fluidity.

The capsules are stripped into receivers consisting of preferably thin cardboards punched with holes somewhat smaller than the capsules, however the receivers may be made of any suitable material.

Having thus described my invention what I claim and desire to secure by Letters Patent is—

1. In a machine for making capsules the combination with a plurality of plates each having a series of pegs, of means for moving said plates; a container for fluid gelatin; means for bringing the pegs on one plate at a time simultaneously into coating relation with the gelatin; means for moving the pegs and gelatin out of the coating position with decreasing speed and means for varying the said decreasing speed of separation.

2. In a capsule machine the combination with a plurality of plates each having a series of pegs, of means for moving said plates; means for coating the pegs on the plates in succession with gelatin to form the capsules; a pinch plate to engage the pegs and strip the capsules from the latter and means for stopping the operation of said devices when the pinch plate is out of position with respect to the pegs.

3. In a capsule machine the combination with a plurality of separate and disconnected plates each having a series of pegs carried thereby, of means for moving said plates; oscillating means for transferring the one plate at a time from one plane to the other and reversing the positions of the pegs; means for coating the pegs of one plate at a time while the same are in a depending position; means for stripping the pegs from one plate at a time; portable receivers having a series of openings to receive the capsule parts as they are stripped from the pegs, and a carriage to sustain the portable receivers.

4. In a capsule machine the combination with a plurality of independent plates each having a series of mold pegs, the pegs on each plate being disposed in a plurality of rows, of means for conveying said plates in a horizontal plane; means for coating the pegs with gelatin to form capsule parts; means for simultaneously stripping the gelatin capsule parts from all the pegs of a plate and means for simultaneously greasing all the pegs of a plate after the capsule parts have been stripped therefrom.

5. In a capsule machine the combination with a plurality of independent plates each having a series of mold pegs, the pegs on each plate being disposed in a plurality of rows, of means for conveying said plates in a horizontal plane; means for coating the pegs with gelatin to form capsule parts; means for simultaneously stripping the gelatin capsule parts from all the pegs of a plate; a flexible greaser having a series of holes corresponding to all the pegs on a peg-carrying plate; a holder for said flexible greaser and means for moving the holder and greaser toward all the pegs on one plate at a time to enter said pegs in the holes of the greaser and simultaneously grease all the said pegs.

6. In a capsule machine the combination with a plurality of independent peg plates each having a series of pegs thereon, of means for moving said plates and pegs intermittently; means for coating all the pegs of a plate simultaneously to form capsule parts; stripping means to remove the capsule parts from the pegs; an electric switch and means connecting the switch and stripping means whereby to operate the switch when the stripping means is out of position.

7. In a machine for making capsules, a peg on which the capsules are formed, means of carrying said peg, a container for a gelatin bath, means for dipping said peg into said container for said gelatin bath, and withdrawing the same at a decreasing speed, and means for varying said decreasing speed consisting of a variable cam adjustable to the decreasing speed required.

8. In capsule making machinery, a peg on which the capsules are formed, means for automatically inverting said peg after having been dipped, and means for adjustably timing the said inversion of said peg consisting of a variable cam operating the same adjustable to the time required.

9. In a capsule machine the combination with a plurality of independent peg-plates of a series of pegs carried on each plate; a container to hold gelatin; means movable toward and from the peg-plates in succession to move the container and the gelatin into contact with all the pegs of a plate simultaneously and means for moving the container and gelatin away from the pegs at a decreasing speed said latter means including an adjustable cam whereby the decreasing speed of withdrawal of the gelatin may be varied.

BENJAMIN THOMAS WINCHESTER.

Witnesses:
THEODORE SCHMECKEBIER,
ELI FRANK.

Copies of this patent may be obtained for five cents each, by addressing the "Commissioner of Patents, Washington, D. C."